United States Patent
Nakamura

Patent Number: 5,252,530
Date of Patent: Oct. 12, 1993

[54] HEAT TRANSFER SHEETS

[75] Inventor: Masayuki Nakamura, Tokyo, Japan

[73] Assignee: Dai Nippon Insatsu Kabushiki Kaisha, Japan

[21] Appl. No.: 614,266

[22] Filed: Nov. 16, 1990

Related U.S. Application Data

[63] Continuation of Ser. No. 404,408, Sep. 8, 1989, Pat. No. 4,990,484.

Foreign Application Priority Data

Sep. 12, 1988 [JP] Japan ................... 63-226426

[51] Int. Cl.$^5$ .............. B41M 5/035; B41M 5/38
[52] U.S. Cl. ................... 503/227; 428/195; 428/913; 428/914
[58] Field of Search ............ 8/471; 428/195, 913, 428/914; 503/227

[56] References Cited

U.S. PATENT DOCUMENTS

| | | | |
|---|---|---|---|
| 4,590,485 | 5/1986 | Uramoto | 346/76 PH |
| 4,810,615 | 3/1989 | Boie et al. | 430/203 |
| 4,829,047 | 5/1989 | Niwa et al. | 503/227 |

FOREIGN PATENT DOCUMENTS

| | | | |
|---|---|---|---|
| 0106211 | 4/1984 | European Pat. Off. | 503/227 |
| 0147747 | 7/1985 | European Pat. Off. | 503/227 |
| 0250954 | 1/1988 | European Pat. Off. | 530/227 |
| 2159971 | 12/1985 | United Kingdom | 503/227 |

Primary Examiner—B. Hamilton Hess
Attorney, Agent, or Firm—Parkhurst, Wendel & Rossi

[57] ABSTRACT

A heat transfer sheet is provided, which includes a base sheet and a dye carrier layer formed on one side of said base sheet, said dye carrier layer carrying a mixture of at least one dye expressed by the following general formula (I) with at least one other sublimable dye showing a maximum absorption wavelength at from 560 to 700 nm and having a molecular weight of at least 345:

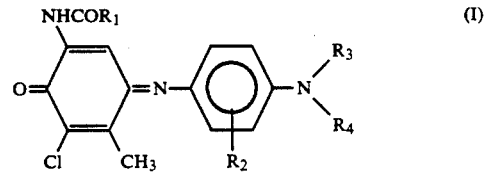

wherein:
$R_1$ to $R_4$ each are a $C_1$ to $C_6$ alkyl group, a cycloalkyl group or a phenyl group, provided that $R_2$ may be a hydrogen atom or an alkoxy group and $R_3$ and $R_4$ may form together a ring.

1 Claim, No Drawings

HEAT TRANSFER SHEETS

This is a continuation of application Ser. No. 07/404,408 filed Sep. 8, 1989, now U.S. Pat. No. 4,990,484.

BACKGROUND OF THE INVENTION

The present invention relates to a heat transfer sheet. More particularly, the present invention has for its object to provide a heat transfer sheet capable of easily giving to a material to be transferred thereon a recording image excellent in color density, distinction and fastness properties.

Heretofore, there has been known various heat transfer systems including a sublimation type of transfer system in which a sublimable dye is carried as a recording medium on a base sheet such as paper to form a heat transfer sheet. The heat transfer sheet is put on a material to be transferred thereon and dyeable with a sublimable dye, for instance, a polyester woven fabric, and a pattern of heat energy is imparted from the back side of the heat transfer sheet to transfer the sublimable dye into the material to be transferred thereon.

In the above sublimation type of transfer system, the material to be transferred comprises a polyester woven fabric for instance. Accordingly, comparatively satisfactory transfer of the dye is achieved as a result of being heated by the heat energy imparted over a relatively extended period of time.

With advancements of recording systems, however, it is increasingly required to form small characters, patterns or photographic images on a material to be transferred. Such material comprises a dye receiving layer on, e.g., polyester sheet or paper. In this case, these images are formed at high speeds by exposure to heat energy with a thermal head for a very short length of time on the order of second or less. Within such a short length of time, it is thus impossible to form an image of sufficient density, since the sublimable dye and the material to be transferred are not sufficiently heated.

To cope with such fast recording, therefore, sublimable dyes excellent in sublimability have been developed. However, problems with such sublimable dyes are that, owing to their low molecular weight, they may pass into the material or bleed on the material after printing, thus the already formed image is to become disturbed or unclear, or contamination surrounding articles is apt to occur.

In the case where a sublimable dye having a relative high molecular weight is used to avoid such problems, it is then impossible to form an image of such satisfactory density as mentioned, since the rate of sublimation drops in such fast recording systems as mentioned above.

SUMMARY OF THE INVENTION

An object of the present invention is to provide a heat transfer sheet capable of giving a distinct and clear image of sufficient density in a heat transfer system using a sublimable dye by imparting heat energy in such a very short length of time as mentioned above, said image being excellent in fastness properties.

The above object is achieved by the present invention as defined below.

That is, the present invention provides a heat transfer sheet characterized by comprising a base sheet and a dye carrier layer formed on one side of said base sheet, said dye carrier layer carrying a mixture of at least one dye expressed by the following general formula (I) with at least one other sublimable dye showing a maximum absorption wavelength at from 560 to 700 nm and having a molecular weight of at least 345.

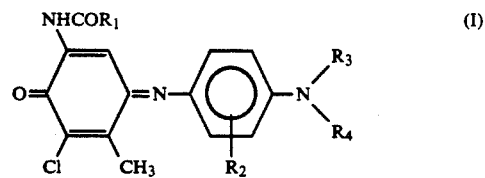

wherein:

$R_1$ to $R_4$ each are a $C_1$ to $C_6$ alkyl group, a clyclalkyl group or a phenyl group, provided that $R_2$ may be a hydrogen atom or an alkoxy group and $R_3$ and $R_4$ may form together a ring.

The dye expressed by the above general formula (I) may be used as the dyes for heat transfer sheets to assume definite cyanic color tones, achieve good heat transfer and form a high-density and definite image. However, they have a property of bleeding from an image receiving layer of the material to be transferred thereon after printing, so that the image may be blurred during long-term storage, and are additionally lacking in such fastness properties as light-fastness.

On the other hand, other cyanic dyes having a high molecular weight or containing a polar group such as a hydroxyl group may form an image of good bleeding resistance and light resistance after printing, but tend to crystallize or precipitate granularly in the dye carrier layer so that their heat transfer deteriorates, failing to form a high-density and definite image.

When using the mixture of the dye(s) expressed by the aforesaid general formula (I) with other sublimable dye(s) showing a maximum absorption wavelength at from 560 to 700 nm and having a molecular weight of at least 345, however, either one of said dyes acts as impurities in the dye carrier layer to limit or reduce a crystallization or precipitation tendency and hence achieve good heat transfer, thus giving an image excelling in color density and distinction.

On the other hand, other dye(s) having a high molecular weight is associated with the dye(s) of the general formula (I) in the image receiving layer to prevent the dye(s) of the general formula (I) from bleeding, thus giving an image excelling in fastness properties such as bleeding resistance and storage properties.

DETAILED DESCRIPTION OF THE INVENTION

The present invention will now be explained in further detail with reference to the preferred embodiments.

The dyes used in the present invention and expressed by the aforesaid general formula (I) are dyes known from, e.g., EP No. 0147747 specification.

Examples of the dyes of the general formula (I) preferably used in the present invention are summarized in Table 1 in terms of the substituents $R_1$ to $R_4$. It is to be noted that $R_2$ is at the o- or m-position with respect to a dialkylamino group.

TABLE 1

| No. | $R_1$ | $R_2$ | $R_3$ | $R_4$ | M.W. |
|---|---|---|---|---|---|
| 1 | $CH_3$ | $CH_3$ | $C_2H_5$ | $C_2H_5$ | 373.5 |

TABLE 1-continued

| No. | $R_1$ | $R_2$ | $R_3$ | $R_4$ | M.W. |
|---|---|---|---|---|---|
| 2 | $CH_3$ | $CH_3$ | $C_2H_5$ | $C_2H_4OH$ | 389.5 |
| 3 | $C(CH_3)_3$ | $CH_3$ | $C_2H_5$ | $C_2H_5$ | 415.5 |
| 4 | $C(CH_3)_3$ | H | $C_2H_5$ | $C_2H_5$ | 401.5 |
| 5 | $C(CH_3)_3$ | $CH_3$ | $C_2H_5$ | $C_2H_4OH$ | 431.5 |
| 6 | $n\text{-}C_5H_{11}$ | H | $C_2H_5$ | $C_2H_5$ | 415.5 |
| 7 | $CH_2C(CH_3)_3$ | H | $C_2H_5$ | $C_2H_5$ | 415.5 |
| 8 | $C_2H_5$ | $CH_3$ | $C_2H_5$ | $C_2H_5$ | 387.5 |
| 9 | $CH_3$ | $OC_2H_5$ | $C_2H_5$ | $C_2H_5$ | 403.5 |
| 10 | $C_3H_7$ | $OC_2H_5$ | $C_2H_5$ | $C_2H_5$ | 431.5 |
| 11 | ph | $CH_3$ | $C_2H_5$ | $C_2H_5$ | 436.5 |

Of the dyes of the general formula (I) usable in the present invention, particular preference is given to dye Nos. 1 and 11 in Table 1, vis., dyes of the following structural formulae (A) and (B):

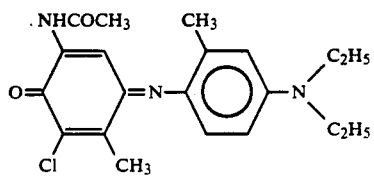
(A)

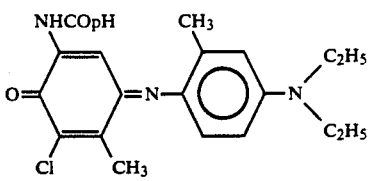
(B)

The dyes of the aforesaid general formula (I) may be used alone or in admixtures.

Other sublimable dyes used in the present invention in the form of a mixture with the dyes of the aforesaid general formula (I) are dyes showing a maximum absorption wavelength at from 560 to 700 nm and having a molecular weight of at least 345. Any dye meeting such requirements may be used. A maximum absorption wavelength below 560 nm is undesired in terms of a hue, whereas any good fastness properties are not achievable at a molecular weight less than 345. Enumerated in Table 2 are preferable dyes which may be used alone or in admixtures.

TABLE 2

1. [structure shown] λmax = 640 nm, M.W. = 515.1

2. [structure shown] λmax = 610 nm, M.W. = 357

3. [structure shown] λmax = 615 nm, M.W. = 384

4. [structure shown] λmax = 644 nm, M.W. = 406

TABLE 2-continued
| | Structure | | |
|---|---|---|---|
| 5. | 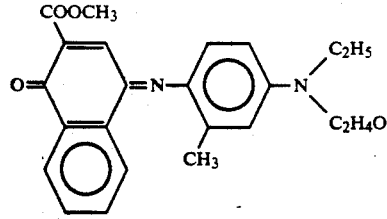 | λmax = 640 nm | M.W. = 392 |
| 6. | 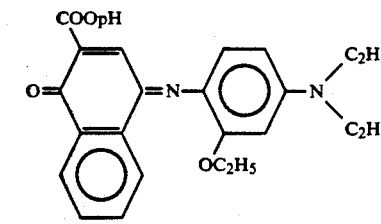 | λmax = 635 nm | M.W. = 468 |
| 7. | 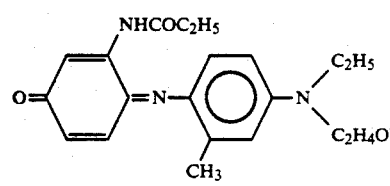 | λmax = 584 nm | M.W. = 355 |
| 8. | 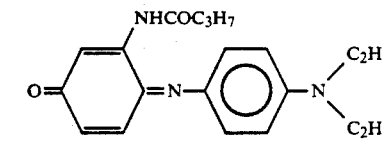 | λmax = 569 nm | M.W. = 345 |
| 9. | 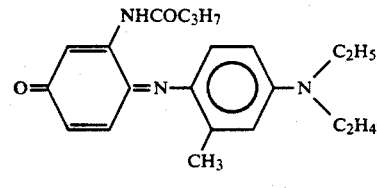 | λmax = 587 nm | M.W. = 369 |
| 10. | 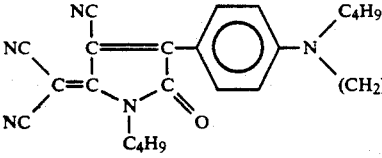 | λmax = 642 nm | M.W. = 491 |
| 11. | 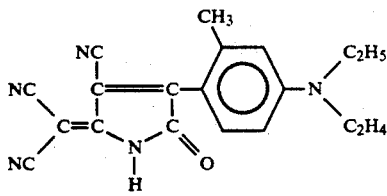 | λmax = 630 nm | M.W. = 347 |
| 12. | 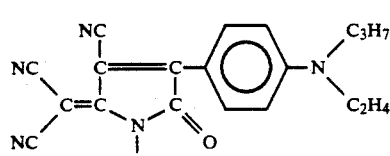 | λmax = 632 nm | M.W. = 421 |

TABLE 2-continued
| 13. |  | λmax = 610 nm<br>M.W. = 463 |
|---|---|---|
| 14. |  | λmax = 605 nm<br>M.W. = 457 |
| 15. | 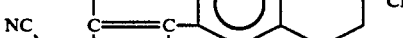 | λmax = 615 nm<br>M.W. = 501 |
| 16. | 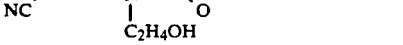 | λmax = 585 nm<br>M.W. = 406 |
| 17. |  | λmax = 595 nm<br>M.W. = 398 |
| 18. | 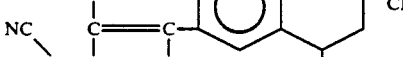 | λmax = 640 nm<br>M.W. = 433 |
| 19. | 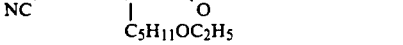 | λmax = 675 nm<br>M.W. = 432 |

TABLE 2-continued

| 20. | (structure shown) | λmax = 650 nm<br>M.W. = 389 |

It is to be noted that the measurements for $\lambda_{max}$ in Table 2 were obtained in ethyl acetate.

In view of the purpose of the present invention, the most preference is given to dye Nos. 1, 5 and 7 in Table 2.

The dye(s) of the general formula (I) is mixed with the dye(s) listed up in Table 2 at a weight ratio of 15:85 to 85:15. Too low or too high mixing ratios are undesired, since any one of high density, definition and fastness then becomes unsatisfactory.

The above dye mixtures are well-solubilized in a general-purpose organic solvent used in the preparation of heat transfer sheets such as, for instance, methyl ethyl ketone, toluene, ethanol, isopropyl alcohol, cyclohexanone or ethyl acetate or a mixed solvent thereof. With such dye mixtures, the dyes are permitted to be present in the dye carrier layer formed on a base sheet in a state of no or low crystallinity, so that they can easily pass into the material to be transferred thereon in a quantity of the heat to be imparted that is much smaller than when they are present in a state of high crystallinity.

The heat transfer sheet of the present invention is characterized by using such a specific dye mixture as mentioned above, and may be similar in otherwise structure to conventional heat transfer sheets known heretofore.

As the base sheet used for the present heat transfer sheet containing such a dye mixture as mentioned above, use may be made of any known sheet having some heat resistance and strength. Usable to this end are, for instance, paper, various coated paper, polyester films, polystyrene films, polypropylene films, polysulfone films, polycarbonate films, aramide films, polyvinyl alcohol films and cellophane, all of 0.5 to 50 μm, preferably 3 to 10 μm in thickness. Particular preference is given to the polyester films.

The dye carrier layer formed on the surface of such a base sheet as mentioned above may be a layer in which the aforesaid dye mixture is carried with any desired binder resin.

As the binder resins to carry the aforesaid dye mixture, use may be made of any resin known heretofore in the art. Preferable for that purpose are, for instance, cellulosic resins such as ethyl cellulose, hydroxyethyl cellulose, ethylhydroxycellulose, hydroxypropyl cellulose, methyl cellulose, cellulose acetate and cellulose acetobutyrate and vinylic resins such as polyvinyl alcohol, polyvinyl acetate, polyvinyl butyral, polyvinyl acetal, polyvinyl pyrrolidone and polyacrylamide. Among others, particular preference is given to polyvinyl butyral and polyvinyl acetal in terms of heat resistance, the transfer of dyes and the like.

The dye carrier layer of the heat transfer sheet according to the present invention is basically formed of the above material but, if required, may contain various additives known in the art as well.

Such a dye carrier layer may preferably be formed by dissolving or dispersing the aforesaid dye mixture and binder resin as well as any other desired components in a suitable solvent to prepare a coating liquid or ink for the formation of the dye carrier layer and coating and drying it on the aforesaid base sheet.

It is preferred that the thus formed dye carrier layer is about 0.2 to 5.0 μm, preferably about 0.4 to 2.0 μm in thickness and contains the aforesaid dye mixture in an amount of 5 to 70% by weight, preferably 10 to 60% by weight relative to the weight thereof.

The heat transfer sheet of the present invention, as mentioned above, may sufficiently be used as such for heat transfer, but may further be provided on its surface with an anti-tack layer, in other words, a release layer. With such a layer, it is possible to prevent the heat transfer sheet from sticking to the material to be transferred thereon during heat transfer and form an image of more improved density by applying a further elevated heat transfer temperature.

For release purposes, some considerable effect is obtained only by the deposition of anti-tack inorganic powders. Further, a release layer of 0.01 to 5 μm, preferably 0.05 to 2 μm in thickness may be formed of a resin excellent in releasability such as, for instance, silicone polymers, acrylic polymers and fluorinated polymers.

It is to be understood that sufficient effect is obtainable even by permitting such inorganic powders as mentioned above or a releasable polymer to be contained in the dye carrier layer.

Still further, such a heat transfer sheet may be provided on its back side with a heat-resistant layer for the purpose of eliminating an adverse influence by the heat of a thermal head.

As the material to be transferred thereon which is used to form an image with such a heat transfer sheet as mentioned above, use may be made of any material having its recording surface receptive to the aforesaid dyes. In the case of paper, metals, glass or synthetic resins, all having no dye receptivity, they may be provided on their one surface with a dye receiving layer.

Included in the materials to be transferred thereon, which need not be provided with any dye receiving layer, are fibers, fabrics, films, sheets, formed products or the like which comprise, e.g., polyolefinic polymers such as polypropylene, halogenated polymers such as polyvinyl chloride and polyvinylidene chloride, vinyl polymers such as polyvinyl acetate and polyacrylic ester, polyester base resins such as polyethylene terephthalate and polybutylene terephthalate, polystyrene base resins, polyamide base resins, resins based on copolymers of an olefin such as ethylene or propylene with other vinyl monomers, ionomers, cellulosic resins such as cellulose diacetate or polycarbonate.

Most preferable are sheets or films comprising polyester or coated paper provided with a polyester layer. However, even paper, metals, glass or other undyeable materials may be formed into the materials to be transferred thereon by coating and drying on their recording surfaces a solution or dispersion of such a dyeable resin as mentioned above. Alternatively, films of such a resin may be laminated on those recording surfaces.

Further, even the dyeable material to be transferred thereon as mentioned above, may be provided on its surface with a dye receiving layer of a resin of more improved dyeability, as is the case with the above paper.

The thus formed resin receiving layer may be formed of a single or plural materials and, as a matter of course, may contain various additives, provided that the desired object is attainable.

Such a dye receiving layer may of any desired thickness, but may generally be 3 to 50 $\mu$m in thickness. That dye receiving layer may also be in continuously coated form, but may be formed by discontinuous coating of a resin emulsion or dispersion.

Such a material to be transferred thereon is basically constructed as mentioned above, and may be satisfactorily used as such. However, the above material to be transferred thereon or its dye receiving layer may contain anti-tack inorganic powders to prevent the heat transfer sheets from sticking thereto at a further elevated heat transfer temperature and carry out more improved heat transfer. Particular preference is given to finely divided silica.

In place of or in addition to the inorganic powders like the above silica, such a resin of improved releasability as mentioned above may be added. Included in the most preferable releasable polymers are, for instance, cured products of silicone compounds such as those comprising epoxy-modified silicone oils and amino-modified silicone oils. Preferably, such a release agent accounts for about 0.5 to 30% by weight of the weight of the dye receiving layer.

For use, the material to be transferred thereon may also be deposited on the surface of its dye receiving layer with such inorganic powders as mentioned to enhance the anti-tack effect. Alternatively, it may be provided on that surface with such a release agent excellent in releasability as mentioned above.

Such a release layer produces sufficient effects at a thickness of about 0.01 to 5 $\mu$m to introduce further improvements in dye receptivity, while preventing sticking to the dye receiving layer of the heat transfer sheet.

As the means for imparting heat energy, which is used in carrying out heat transfer with such a heat transfer sheet of the present invention as above and such a material to be recorded thereon as mentioned above, use may be made of any heat energy imparting means known heretofore in the art. For instance, the desired object is well-achieved by imparting a heat energy of about 5 to 100 mJ/mm$^2$ by controlling a recording time with a recording unit such as a thermal printer (e.g., Video Printer VY-100 manufactured by Hitachi, Ltd.).

According to the present invention as mentioned above, a high-density and definite image is formed by using a specific dye mixture as the dyes for heat transfer sheets. Since such an image excels in bleeding resistance and stain resistance in particular, it is unlikely that even when stored over an extended period of time, the image may deteriorate in terms of sharpness or may contaminate other articles upon contacting. Thus, various problems of the prior art can be solved.

The present invention will now be explained in further detail with reference to the examples and comparison examples, throughout which "parts" and "%" are on weight basis unless otherwise specified.

EXAMPLES

Ink compositions having the following composition were prepared for the formation of the dye carrier layer, and were then coated and dried on a 6-$\mu$m thick polyethylene terephthalate film subjected on its back side to heat-resistant treatments in an amount of 1.0 g/m$^2$ on dry basis to obtain the present heat transfer sheets specified in Table 3 to be given later.

| | |
|---|---|
| Dye (I) in Table 1 plus Dye (II) in Table 2: | 3.0 parts in all |
| Polyvinyl butyral resin | 4.5 parts |
| Methyl ethyl ketone: | 46.25 parts |
| Toluene: | 46.25 parts |

However, when the dye mixtures were insoluble in the above composition, DMF, dioxane, chloroform, etc. were optionally used as solvents.

Next, synthetic paper (Yupo FPG #150 manufactured by Oji Yuka Co., Ltd., Japan) was used as the base sheet, and a coating liquid having the following composition was coated on one side of that paper in a proportion of 10.0 g/m$^2$ on dry basis, followed by drying at 100° C. for 30 minutes, thereby obtaining a material to be transferred thereon.

| | |
|---|---|
| Polyester resin (Vylon 200 manufactured by Toyobo Co., Ltd., Japan): | 11.5 parts |
| Vinyl chloride/vinyl acetate copolymer (VYHH manufactured by UCC): | 5.0 parts |
| Amino-modified silicone (KF-393 manufactured by Shin-Etsu Chemical Co., Ltd., Japan): | 1.2 parts |
| Epoxy-modified silicone (X-22-343 manufactured by Shin-Etsu Chemical Co., Ltd., Japan): | 1.2 parts |
| Methyl ethyl ketone/toluene/cyclohexanone (4:4:2 in weight ratio): | 102.0 parts |

Each of the aforesaid heat transfer sheets of the present invention was put on the above material to be transferred thereon with the dye carrier layer and the dye receiving layer being in opposition to each other, and recording was performed from the back side of the heat transfer sheet with a thermal head under the conditions of a voltage of 10V applied on the head and a printing time of 4.0 msec. to obtain the results set forth in Table 3.

TABLE 3

| Types of Dyes | | Mixing Ratio | Color | |
|---|---|---|---|---|
| I | II | I/II | density | Fastness |
| 1 | 1 | 50/50 | 2.10 | ⊚ |
| 1 | 2 | 50/50 | 2.05 | ○ |
| 1 | 3 | 50/50 | 2.00 | ○ |
| 1 | 4 | 50/50 | 1.97 | ⊚ |
| 1 | 7 | 50/50 | 1.85 | ⊚ |
| 1 | 9 | 50/50 | 1.85 | ⊚ |
| 1 | 10 | 50/50 | 1.92 | ⊚ |
| 1 | 15 | 50/50 | 1.89 | ⊚ |
| 1 | 20 | 50/50 | 2.05 | ⊚ |
| 2 | 1 | 40/60 | 2.10 | ⊚ |
| 3 | 5 | 60/40 | 1.90 | ⊚ |
| 5 | 7 | 30/70 | 2.00 | ⊚ |
| 7 | 1 | 80/20 | 1.95 | ⊚ |
| 10 | 5 | 15/85 | 1.83 | ⊚ |

TABLE 3-continued

| Types of Dyes | | Mixing Ratio I/II | Color density | Fastness |
|---|---|---|---|---|
| I | II | | | |
| 11 | 1 | 50/50 | 1.90 | ⊙ |
| 11 | 2 | 50/50 | 1.85 | ○ |
| 11 | 5 | 40/60 | 1.83 | ○ |
| 11 | 7 | 50/50 | 1.95 | ○ |
| 11 | 13 | 70/30 | 2.05 | ○ |
| 11 | 17 | 50/50 | 1.95 | ⊙ |
| 11 | 18 | 50/50 | 1.85 | ○ |

In the above table, the mixing ratios are on wight basis. The hues of the mixed dyes all assume a cyanic color.

COMPARISON EXAMPLES

The Examples were repeated using the dyes specified in Table 4 in place of the dyes used therein under otherwise similar conditions. The results are summarized in Table 4.

TABLE 4

| Types of Dyes | | Mixing Ratio I/II | Color density | Fastness |
|---|---|---|---|---|
| I | II | | | |
| *1 | — | — | 2.45 | × |
| *2 | — | — | 2.10 | Δ |
| — | *3 | — | 1.45 | ⊙ |
| — | *4 | — | 1.55 | ⊙ |
| *1 | *5 | 50/50 | 2.20 | × |
| *2 | *6 | 50/50 | 2.15 | × |

*1 dye 1 in Table 1
*2 dye 11 in Table 1
*3 dye 1 in Table 2
*4 dye 5 in Table 2

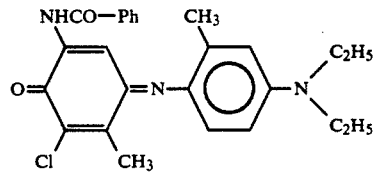

It is to be noted that the measurements for color densities given in Tables 3 and 4 were obtained with Densitometer RD-918 manufactured by Macbeth, U.S.A.

The recorded images were measured in terms of fastness after they had been permitted to stand for an extended period of time in an atmosphere of 50° C., and were then evaluated as follows.

⊙: Neither change in the sharpness of the recorded images nor coloration of white paper even after they were rubbed with the white paper.

○: Slight deterioration of sharpness with slight coloration of white paper.

Δ: Deterioration of sharpness with coloration of white paper.

×: Blurred images with marked coloration of white paper.

I claim:
1. A heat transfer sheet comprising:
a base sheet; and
a dye carrier layer formed on said base sheet, said dye carrier layer comprising a binder and a dye represented by the following formula:

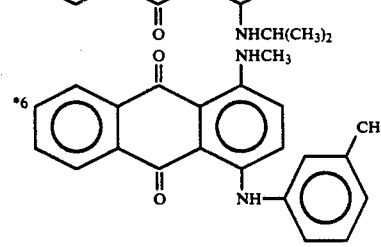

wherein Ph is a phenyl group.

* * * * *